United States Patent Office 3,290,361
Patented Dec. 6, 1966

3,290,361
PREPARATION OF POLYNUCLEAR AROMATIC ACETATE PLASTICIZERS BY CONDENSATION OF TOLUENE AND FORMALDEHYDE
John L. Tveten, Baytown, and Rowland Pettit, Austin, Tex., assignors, by mesne assignments, to Esso Research and Engineering Company, Elizabeth, N.J., a corporation of Delaware
No Drawing. Filed June 10, 1964, Ser. No. 374,189
6 Claims. (Cl. 260—494)

The present invention relates to an improved method of condensing toluene and formaldehyde to produce a condensation product of increased ester content, whereby an improved nonstaining plasticizer for polyvinyl chloride floor tile can be obtained.

In particular, the present invention relates to a process of optimizing the ester production in the condensation of toluene and paraformaldehyde in the presence of acetic acid and sulfuric acid, by adding the toluene and sulfuric acid in regular increments over an extended period of time to the paraformaldehyde and acetic acid, which comprises the reaction mass.

The present invention is directed to the production of a plasticizer for polyvinyl chloride floor tile. In the manufacture of polyvinyl chloride floor tile, a number of requirements must be met if a plasticizer is to be effective and suitable for use. First, the plasticizer must be compatible with the polyvinyl chloride, that is, the polyvinyl chloride must accept without "weeping" enough of the plasticizer to allow the plasticizer to be effective. Secondly, the plasticizer must have an efficiency sufficient to impart to the polyvinyl chloride the desired flexibility without the incorporation of excessive amounts of the plasticizer. Although most plasticizers are not stain resistant, this characteristic is highly desirable so as to avoid development of a darkened color during use of the tile.

In choosing a stain-resistant plasticizer, both the efficiency of the plasticizer and its resistance to staining must be considered. Staining of floor tile takes place mostly within the plasticizer in the tile; and the more plasticizer that is present, the greater the amount of staining bodies that will be absorbed by the tile. Further, some plasticizers are more susceptible to staining than others, so that at equal efficiencies one plasticizer may contain within itself more staining bodies than a second plasticizer.

Of the plasticizers currently being used in polyvinyl chloride floor tile, the ones used in the largest amounts are dioctyl phthalate (DOP), butylbenzyl phthalate (BBP), and ditetrahydrofurfural phthalate (DTHFP).

The properties of these various plasticizers are compared in the following Table I with the properties of toluene-formaldehyde condensation products obtained by adding sulfuric acid to the other reactants and by adding both sulfuric acid and toluene to the other reactants.

As is seen from Table I, the product of Example 3 is not equivalent in efficiency to the DOP and BBP but is superior thereto in stain resistance, and is generally comparable to the DTHFP while being considerably less expensive.

In the condensation reaction, both esters and hydrocarbons are formed which have one, two, three, or four TABLE I
PLASTICIZER COMPARISONS [a]

| Plasticizer | DOP | BBP | DTHFP | I (C–F)[b] | Ditolyl-methane-methylol Acetate |
|---|---|---|---|---|---|
| Efficiency: | | | | | |
| 100% Modulus, p.s.i. | 1,735 | 1,870 | 2,560 | 2,925 | 1,910 |
| Shore A hardness | 84 | 83 | 93 | 94 | 82 |
| Staining: | | | | | |
| Yellow Dye [c] | 10 | 7 | 5 | 5 | 3 |
| Brown Dye [c] | 10 | 7 | 4 | 3 | 2 |
| Asphalt [d] | 4 | 3 | 0–1 | 0–1 | 2 |
| Volatility: | | | | | |
| Carbon Black Volatility, percent loss | 1.3 | 2.5 | 1.1 | 3.1 | 10.2 |
| Processing loss or Plasticizer, percent | | | | | ~2 |

[a] Formulation: 50 parts per hundred by weight (phr.) of plasticizer in clear polyviny chloride (PVC).
[b] Compounds C–F of Example 1.
[c] Code: 0=No staining to 10= Heavy staining.
[d] Code: 0=None. 1=Very slight. 2=Slight. 3=Light. 4=Moderate. 5=Heavy staining.

aromatic nuclei connected by methyl bridges. The esters (particularly the 2-nuclei ester) are highly efficient plasticizers, whereas the hydrocarbons are so low in efficiency as to be undesirable. The present invention is directed toward increasing the production of the dinuclear ester, ditolylmethanemethylol acetate (which has been found to be the most effective compound as a plasticizer) at the expense of the less desirable dinuclear (ditolylmethane) and trinuclear hydrocarbons (bis[xylyl]toluene). In the bath process of condensing toluene and formaldehyde in the presence of acetic acid and sulfuric acid, this is accomplished by adding the sulfuric acid and toluene in regular increments or continuously over a period of 1 to 4 hours and then maintaining the resultant reaction mixture under reaction conditions for an additional 2 to 5 hours to a desired total reaction time of 4 to 6 hours.

The reactants are toluene, formaldehyde, and acetic acid, with sulfuric acid being used as a catalyst.

The toluene may be obtained by any number of well-known processes, for example, by distillation of catalytically reformed naphtha. The toluene should be essentially pure, but may contain small amounts of other aromatic compounds, as is normally the case in commercial grade toluene.

Glacial acetic acid is preferred in amounts ranging from 0.1 to 1.5 moles per mole of toluene added. Up to about 5% water in the acetic acid may be tolerated, however.

Formaldehyde is employed either as a solid (paraformaldehyde, trioxane, etc.), a liquid (formalin) or as a gas. In order to facilitate handling and to avoid dilution of the sulfuric acid, paraformaldehyde having a molecular weight of 180 to 3000 is preferred. From 0.9 to 2.0 moles of formaldehyde are used for each mole of toluene to be added. Paraformaldehyde may be wholly or partially dissolved in the glacial acetic acid before initiation of the reaction. Some of the paraformaldehyde may remain solid and will float on the surface of the reaction mixture at least during the initial stage of the reaction.

Sulfuric acid is employed at a net concentration of 40% to 70% by weight, the remainder being water. At concentrations below 40%, the rate of reaction drops markedly, while at concentrations above about 70%, the color of the product deteriorates until at 98% concentration only a black, intractable mass is obtained. The sulfuric acid is added concurrently with toluene into the reaction zone, in amounts ranging from 0.1 to 0.3 mole per mole of toluene. Below about 0.1 mole/mole the reaction rate is extremely low, whereas above 0.3 mole/mole the ester-to-hydrocarbon ratio declines. The sulfuric acid catalyst is preferably added to the reaction mixture at the same time rate as the toluene, i.e., so that the total addition time is the same for both toluene and sulfuric acid. However, the addition time for sulfuric acid may range from one-half to one and one-half times the addition time employed with the toluene. For example, where toluene is added over a 4-hour period, sulfuric acid may be added over a period of only 2 hours or over a 6-hour period.

Both the sulfuric acid and toluene are added in increments over the addition period, preferably continuously. The increments are chosen so that, after the first 90 minutes of recation, the toluene in the hydrocarbon phase does not exceed a concentration of about 50%. Thus, it is apparent that the increments may be regular (i.e., of equal proportions) or irregular, and the additions may be made at regular intervals or irregular intervals. Regular increments and regular intervals are preferred if continuous addition is not used. As used hereinafter, the phase "regular increments" includes continuous addition at a constant rate as well as addition in regular increments at regular intervals.

Reaction conditions include a temperature of 75° C. to 150° C. and a pressure of 15 p.s.i.a. to 70 p.s.i.a. The reaction is preferably carried out under reflux conditions (atmospheric pressure and about 100° C.) in order to simplify controlling heat removal, and at atmospheric pressure to avoid the use of expensive pressure vessels.

The time of addition of toluene may range from 1 to 4 hours, and total reaction time from 4 to 6 hours.

After the condensation reaction is complete, the hydrocarbon phase and acid phase are separated. The hydrocarbon phase may be water washed and/or neutralized by a caustic wash to remove trace acids, and is then fractionated to obtain a hydrocarbon cut boiling above 200° C. at 20 mm. Hg pressure and having an ester-to-hydrocarbon ratio of at least 3.0. A typical product is shown in Example 3, below.

In order to illustrate the invention, the following examples are given.

*Example 1*

*Addition of $H_2SO_4$ only.*—Four moles (120 g.) of formaldehyde in the form of paraformaldehyde having a molecular weight of about 180 to 3000, 3.75 moles (225 g.) of glacial acetic acid, and 4 moles (368 g.) of toluene were admixed in a reaction flask and heated to 100° C. While agitating the formaldehyde, acetic acid and toluene reaction admixture, 0.735 mole (103 g.) of 70 weight percent sulfuric acid was added to the mixture dropwise over a period of 2 hours. Dropwise addition of the sulfuric acid was continuous over this period. At the end of 2 hours, the addition of sulfuric acid was terminated and the reaction maintained for 4 more hours at 100° C. (the reflux temperature for the admixture). The pressure during the reaction was substantially atmospheric. Samples were taken at the end of 6 hours. At the end of the 6-hour reaction period, agitation was stopped and the reaction mixture separated into an acid layer and a supernatant oil layer. The oil layer was withdrawn and water washed three times with 250 cc. of water and thereafter dried over calcium chloride. The hydrocarbon samples were analyzed and the following results obtained.

TABLE II 6-hour sample: Toluene 7.7; A, 10.2; B, 44.6; C, 21.8; D, 9.4; E, 5.0; F, 1.3.

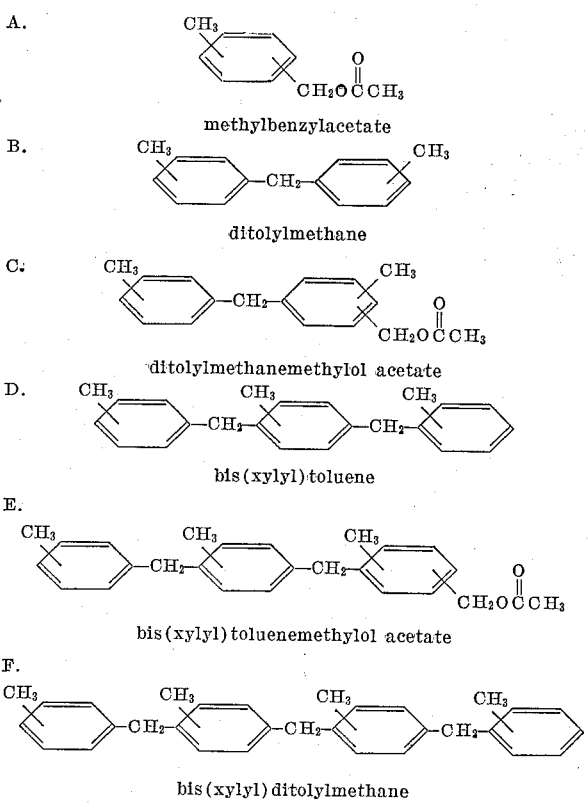

A. methylbenzylacetate

B. ditolylmethane

C. ditolylmethanemethylol acetate

D. bis(xylyl)toluene

E. bis(xylyl)toluenemethylol acetate

F. bis(xylyl)ditolylmethane

The hydrocarbon layer was fractionated to obtain a plasticizer oil containing the dinuclear ester, trinuclear hydrocarbon, the trinuclear ester, and the quadrinuclear hydrocarbon represented as "C," "D," "E," and "F" in the analysis. This plasticizer had an analysis as follows:

TABLE III

| Compound: | Wt. percent |
|---|---|
| C | 58.1 |
| D | 25.1 |
| E | 13.3 |
| F | 3.5 |
| Ester/hydrocarbon ratio | 2.5 |

*Example 2*

*Addition of toluene only.*—The same proportions of reactants as in Example 1 were used, except that the paraformaldehyde, acetic acid, and sulfuric acid were admixed in the reaction flask and heated to 100° C. and the 4 moles of toluene were added dropwise and continuously over a period of 2 hours, while maintaining the reaction zone under continuous agitation and reflux. A total reaction time of 6 hours was used, and samples were taken at 2, 4, and 6 hours. The oil layer was withdrawn and water washed three times with 250 cc. of water, and thereafter dried over calcium chloride. The analysis at the end of each sample period is shown below.

TABLE IV

| | Toluene | Compound | | | | | | |
| --- | --- | --- | --- | --- | --- | --- | --- | --- |
| | | A | B | C | D | E | F | C+E/D+F |
| 2 Hours, Wt. Percent | 52.1 | 14.9 | 21.6 | 4.8 | 4.1 | 1.7 | 0.8 | 1.3 |
| 4 Hours, Wt. Percent | 38.6 | 20.8 | 25.9 | 7.8 | 4.6 | 1.8 | 0.5 | 1.9 |
| 6 Hours, Wt. Percent | 24.3 | 17.9 | 34.7 | 12.8 | 6.2 | 2.9 | 1.2 | 1.2 |

The hydrocarbon product was fractionated to obtain a plasticizer oil consisting of Compounds "C", "D", "E", and "F". The composition of this plasticizer oil is shown below.

TABLE V

| Compound: | Wt. percent |
| --- | --- |
| C | 55.4 |
| D | 26.8 |
| E | 12.6 |
| F | 5.2 |
| Ester/hydrocarbon ratio | 2.1 |

*Example 3*

*Addition of both toluene and sulfuric acid.*—The same proportion of reactants as in Example 1 was utilized in Example 3. However, only the acetic acid and formaldehyde were placed in the reaction flask and both sulfuric acid and toluene were added continuously and dropwise over a period of 4 hours, after which the reactants were refluxed for an additional 2 hours for a total reaction time of 6 hours. Samples were taken at the end of 4 hours and at the end of 6 hours, and the following analysis was obtained.

| | Toluene | Compound | | | | | | |
| --- | --- | --- | --- | --- | --- | --- | --- | --- |
| | | A | B | C | D | E | F | C+E/D+F |
| 4 Hours, Wt. Percent | 49.6 | 13.9 | 29.2 | 4.8 | 1.8 | 0.7 | ------ | 3.1 |
| 6 Hours, Wt. Percent | 27.5 | 17.2 | 39.1 | 10.4 | 3.9 | 1.9 | ------ | 3.2 |

Note that even at 4 hours the ester-to-hydrocarbon ratio is 3.1, and hydrocarbon "F" is completely eliminated.

The product was fractionated in order to obtain a plasticizer oil having only constitutents "C," "D," and "E," and this plasticizer oil had the following analysis.

TABLE VI

| Compound: | Wt. percent |
| --- | --- |
| C | 64.2 |
| D | 24.1 |
| E | 11.7 |
| Ester/hydrocarbon ratio | 3.2 |

*Example 4*

*Increasing acetic acid concentration.*—In an effort to increase the ester-to-hydrocarbon ratio, the effective concentration of acetic acid was increased by a factor of 4 as follows. The reaction mixture of 1 mole (92 g.) of toluene, 1 mole (30 g.) of paraformaldehyde, and 4 moles (240 g.) of glacial acetic acid maintained under reflux conditions (100° C.), and 0.185 mole (26 g.) of 70% sulfuric acid was added dropwise and continuously over a period of 2 hours, with reflux conditions being maintained an additional 4 hours for a total of 6 hours. At the end of 6 hours, the hydrocarbon was separated from the acid layer as in Example 1 above and water washed and dried. The product had the following composition.

TABLE VII

| | Toluene | Compound | | | | | | |
| --- | --- | --- | --- | --- | --- | --- | --- | --- |
| | | A | B | C | D | E | F | C/D |
| 6 Hours, Wt. Percent | 8.5 | 0.7 | 29.9 | 5.5 | 29.2 | 8.5 | 17.7 | 0.3 |

Referring to the table above, it is apparent that the ester-to-hydrocarbon ratio of 0.3 is substantially less than that of 2.5 obtained in Example 1 and of 3.2 obtained in Example 3. Thus, increasing the acetic acid concentration will not of itself increase the ester-to-hydrocarbon ratio in the product.

*Example 5*

*Lower temperatures.*—The procedure and amounts utilized in Example 1 were followed in this example except that the reaction temperature was lowered to 70° C. from 100° C. Very low conversion to plasticizer range material was obtained. The product was worked up in the same manner as in Example 1, and the following analysis was obtained.

TABLE VIII

| | Toluene | Compound | | | | | |
| --- | --- | --- | --- | --- | --- | --- | --- |
| | | A | B | C | D | E | F |
| 4-Hr. sample | 84.9 | 10.5 | 4.1 | 0.5 | ------ | ------ | ------ |
| 6-Hr. sample | 68.7 | 20.5 | 10.0 | 0.8 | ------ | ------ | ------ |
| 7½-Hr. sample | 63.3 | 23.3 | 12.3 | 1.1 | ------ | ------ | ------ |

*Example 6*

*Use of 30 weight percent sulfuric acid.*—The procedure and amounts of reactants in Example 1 were repeated except that the sulfuric acid being added dropwise had a rate concentration of only 30 weight percent. The reaction was very slow with no appreciable product being obtained at the end of 6 hours.

*Example 7*

*Use of 98 weight percent sulfuric acid.*—Example 1 was repeated using 98 weight percent sulfuric acid instead of 70 weight percent sulfuric acid. A black, intractable product was obtained at the end of 6 hours.

The use of the 98 weight percent acid was characterized by the formation of a black haze within the reaction mixture at the point of intrduction of each drop, with the reaction mass progressively darkening until a black, intractable product was obtained at the end of 6 hours.

*Example 8*

*The use of small amounts of sulfuric acid.*—The procedure of Example 1 was followed except that sulfuric acid addition was stopped after 0.01 mole of 70 weight percent sulfuric acid had been added to the reaction mass. The reactants were refluxed for a total of 6 hours, after which it was sampled for product. No reaction had taken place.

The examples are compared below.

TABLE IX

| Example | Remarks | Product Analysis After 6 Hours | | | | | | | |
|---|---|---|---|---|---|---|---|---|---|
| | | Toluene | A* | B* | C* | D* | E* | F* | C/D |
| 1 | H$_2$SO$_4$ added dropwise to reaction mass. | 7.7 | 10.2 | 44.6 | 21.8 | 9.4 | 5.0 | 1.3 | 2.3 |
| 2 | Toluene added dropwise. | 24.3 | 17.9 | 34.7 | 12.8 | 6.2 | 2.9 | 1.2 | 2.1 |
| 3 | Both toluene and H$_2$SO$_4$ added dropwise. | 27.5 | 17.2 | 39.1 | 10.4 | 3.9 | 1.9 | | 2.7 |
| 4 | H$_2$SO$_4$ added dropwise increased acetic acid concentration. | 8.5 | 0.7 | 29.9 | 5.5 | 29.2 | 8.5 | 17.7 | 0.2 |
| 5 | H$_2$SO$_4$ added dropwise Temp. lowered to 70° C. | 68.7 | 20.5 | 10.0 | 0.8 | Reaction quite slow. | | | |
| 6 | 30–40 Wt. percent H$_2$SO$_4$ added dropwise. | Reaction very slow—no appreciable product. | | | | | | | |
| 7 | 98 Wt. percent H$_2$SO$_4$ added dropwise. | Black, intractable product. | | | | | | | |
| 8 | H$_2$SO$_4$ addition stopped after 0.01 mole added. | No reaction. | | | | | | | |

*Compounds "A" through "F" are as follows:

A. 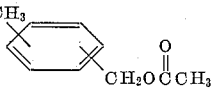

B. 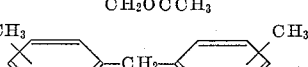

C. 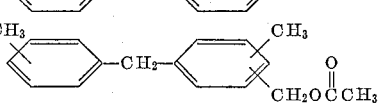

(Also includes some of the corresponding alcohol not resolved by boiling point.)

D. 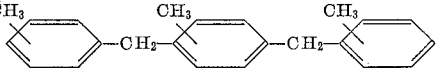

E. 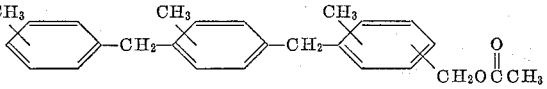

F. 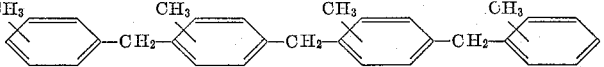

In order to evaluate the products as plasticizers, the following examples are given.

*Example 9*

Test pads of polyvinyl chloride were prepared utilizing the plasticizer of Example 1 and ditolylmethanemethylol acetate, as well as dioctyl phthalate and butylbenzyl phthalate, and DTHFP. These test pads were obtained by admixing 50 parts by 100 by weight of the chosen plasticizer in clear polyvinyl chloride, after which a stock sheet of 80 mils thickness was prepared which was cut and molded into test pads having a dimension of 6" x 6" x 75 mils. The test pads were then subjected to tests to determine their 100% modulus, the Shore "A" hardness, and stain and volatility characteristics. These results have been set forth hereinabove in Table I.

Having set forth in detail the essence of the present invention and the best mode contemplated, what is desired to be protected by Letters Patent should be determined not from the specific examples herein given, but rather by the appended claims.

We claim:

1. In a batch process for condensing toluene and formaldehyde in the presence of acetic acid and sulfuric acid, the method of optimizing the production of polynuclear acetate esters which comprises admixing 0.9 to 2.0 moles of paraformaldehyde with from 0.5 to 1.5 moles of glacial acetic acid to obtain an admixture, heating said admixture to a temperature within the range of 75° C. to 150° C. and a pressure of 15 to 70 p.s.i.a., and adding to said admixture over a period of 1 to 4 hours 1 mole of toluene and 0.1 to 0.3 mole of sulfuric acid having a concentration of 40 to 70 weight percent, and maintaining said reaction conditions for 2 to 5 hours after completion of the toluene and sulfuric acid addition, and thereafter recovering a hydrocarbon product boiling above 200° C. at 20 mm. Hg pressure and having an ester-to-hydrocarbon ratio of at least 3.0 to 1.

2. A method in accordance with claim 1 wherein the toluene addition is made over a period of 4 hours.

3. A batch process of producing a toluene-formaldehyde condensation product of increased ester content which comprises at a temperature of 75° C. to 150° C.

and a pressure of 15 to 70 p.s.i.a. over a period of 1 to 4 hours:
adding 1 molar part of toluene
and from 0.1 to 0.3 molar parts of 40 to 70 weight percent sulfuric acid
to an admixture of
    0.5 to 1.5 molar parts of glacial acetic acid,
    0.9 to 2.0 molar parts of formaldehyde,
while maintaining said admixture in an agitated state,
and maintaining said temperature, pressure and agitation for from 2 to 5 hours after completion of toluene and sulfuric acid addition.

4. A process in accordance with claim 3 wherein the temperature and pressure are chosen to maintain the reaction under reflux conditions.

5. A method in accordance with claim 4 wherein the toluene and sulfuric acid are added over a period of 4 hours, and the total reaction time is 6 hours.

6. In a process for condensing toluene and formaldehyde in the presence of sulfuric acid and acetic acid, the method of optimizing the production of polynuclear acetate esters which comprises
in a reaction zone, forming an admixture of from 0.9 to 2.0 moles of paraformaldehyde with from 0.5 to 1.5 moles of glacial acetic acid and from 0 to 0.3 mole of sulfuric acid having a concentration of 40 to 70 weight percent,
and adding to said admixture 1 mole of toluene and from 0 to 0.3 mole of sulfuric acid having a concentration of 40 to 70 weight percent, said addition being made in regular increments at a rate chosen to maintain the concentration of unreacted toluene in the hydrocarbon phase within said reaction zone less than 50 weight percent,
maintaining the admixture at 75° C. to 150° C. and 15 to 70 p.s.i.a. during said addition and for 2 to 5 hours thereafter,
and recovering a product boiling above 200° C. at 20 mm. Hg pressure and having an ester-to-hydrocarbon ratio of at least 3.0.

References Cited by the Examiner
UNITED STATES PATENTS
2,761,884   9/1956   Koorevaar  ---------- 260—668

LORRAINE A. WEINBERGER, *Primary Examiner.*

V. GARNER, *Assistant Examiner.*